March 25, 1958  M. L. BRADWAY  2,827,991
OVER-RUNNING CLUTCH
Filed Sept. 30, 1955  2 Sheets-Sheet 1
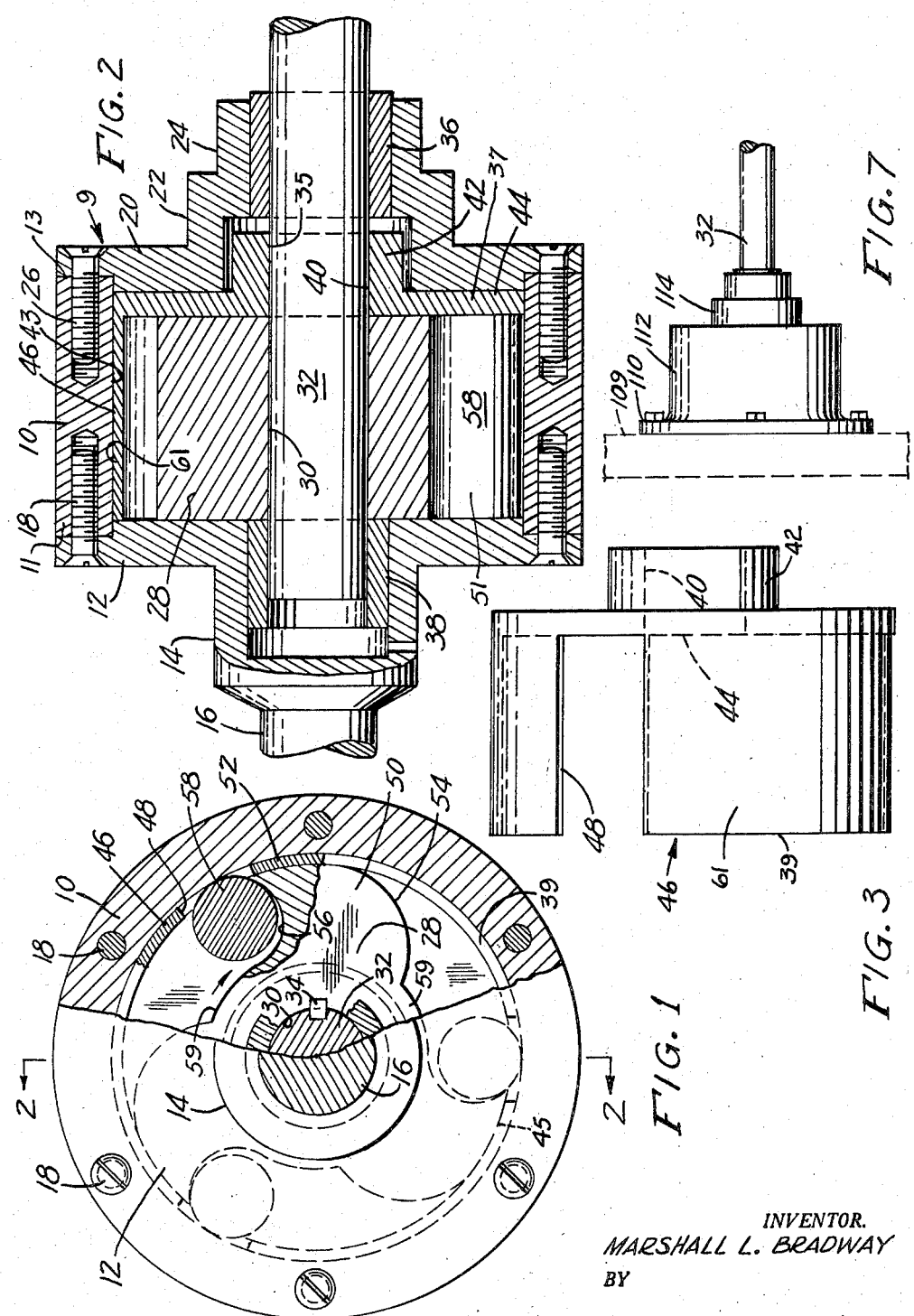
INVENTOR.
MARSHALL L. BRADWAY
BY
McMorrow, Berman + Davidson
ATTORNEYS March 25, 1958     M. L. BRADWAY     2,827,991
OVER-RUNNING CLUTCH
Filed Sept. 30, 1955     2 Sheets-Sheet 2
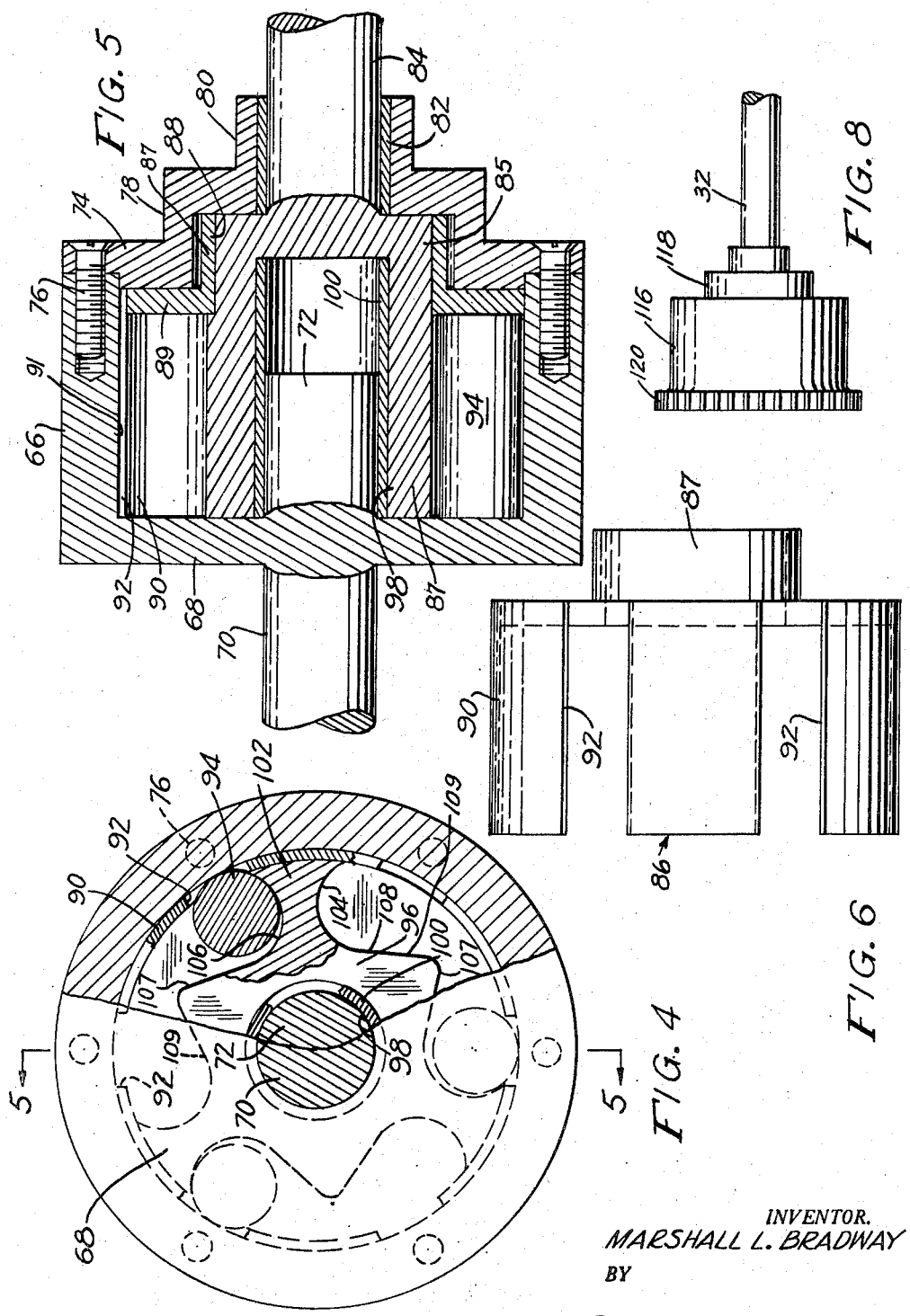
INVENTOR.
MARSHALL L. BRADWAY
BY
McMorrow, Berman + Davidson
ATTORNEYS United States Patent Office 2,827,991
Patented Mar. 25, 1958

2,827,991

OVER-RUNNING CLUTCH

Marshall L. Bradway, Stafford Springs, Conn.

Application September 30, 1955, Serial No. 537,818

1 Claim. (Cl. 192—45)

This invention relates to improvements in over-running roller clutches.

The main object of the present invention is to provide generally improved clutches of the type referred to which are simple in construction, composed of a small number of parts which are easily assembled and disassembled, which are efficient and reliable in operation, and which can be made in rugged and serviceable forms at relatively low cost.

Other objects of the invention will appear from the following description and from the annexed drawing, in which like reference characters designate like parts throughout the several views, and wherein:

Figure 1 is an end elevational view of a clutch in accordance with the present invention, portions being broken away and in section to show interior construction;

Figure 2 is a longitudinal sectional view taken on line 2—2 of Figure 1;

Figure 3 is a side elevational view of the roller retainer or guide ring;

Figure 4 is a view similar to Figure 1 of the opposite end of a modified form of the invention;

Figure 5 is a longitudinal sectional view on line 5—5 of Figure 4;

Figure 6 is a side elevational view of the roller retainer or guide ring of the modified form;

Figure 7 is a side elevational view showing a modified form of drive connection of a clutch shaft to drive means; and, Figure 8 is a view similar to Figure 7 showing form of drive connection between a clutch shaft and a geared drive means.

Referring in detail to the drawings, and first to Figures 1 to 3 thereof, the clutch therein shown comprises a cylindrical housing 9 comprising an annulus 10 having first and second ends 11 and 13, respectively. A first end plate 12 integrally provided with a hollow cylindrical axially extending boss 14 rigidly secured to the adjacent end of a driven shaft 16. Screws 18, or equivalent fastening means, are employed to fixedly connect the end plate 12 to the first end 11 of the annulus 10 at selected locations about the circumference thereof.

A second end plate 20 has an axial outwardly extending hollow cylindrical boss 22 terminating in a reduced hollow cylindrical axial extension 24. End plate 20 is fixed to the second end 13 of the annulus 10 by means of screws 26.

Designated at 28 is a rotor confined within the housing and having an axial bore 30 through which extends a drive shaft 32 keyed to the rotor, as at 34. A bearing, such as a bushing 36 in the axial extension 24 of the boss 12 provides a journal for the shaft 32 in the related end of the housing 9. Another bearing, such as a bushing 38 is engaged in the cylindrical boss 14 and provides a journal for the shaft at the other end of the housing.

Within the housing the shaft 32 extends through an axial bore 35 formed in an axial boss 42 on the axially outward side of the end wall 37 of a cylindrical cup-shaped roller retainer or guide ring 46, the peripheral wall 39 of the ring 46 having uniformly circumferentially spaced slots 48. The outer surface 41 of the ring 46 runs on the inner surface 43 of the annulus 10. The ring 46 is free to rotate within the housing and relative to the shaft 32, and its main function, as will presently appear, is to retain the rollers (to be described hereinafter) properly spaced from each other and parallel to shaft 32.

The outer surface 45 of the rotor 28 is formed at locations spaced about its circumference correspondingly to the slots 48 with wings or vanes 50, having arcuate outer ends 52 in wiping contact with the inner surface 43 of the peripheral wall 39 of the roller retainer ring 46. One end 54 of the wings 50 is convexly curved, while the other ends 56 are concave, the concavity of the ends 56 extending through substantially less than 360 degrees of a circle, and having a center of curvature substantially similar to that of the cylindrical rollers 58 confined in the spaces between adjacent wings 30. Adjacent pairs of wings 50 define recesses 51 therebetween. The bottoms or inner walls 59 of the recesses 51 are curved eccentrically to the axis of rotation of the rotor 28 to provide cam surfaces. The rotor ends bear against the end plates 12 and 20.

When the shaft 32 is rotated and the rotor 28 turns therewith, in the direction of the arrow in Figure 1, the rollers 58 are engaged by the cam surfaces 59 and wedged between the cam surfaces 59 and the inner surface 43 of the annulus 10, so as to connect the rotor 28 and the annulus 10 in direct drive, so as to drive the driven shaft 16.

The retainer ring slots 48, it should be noted, are no greater in width than the diameter of the rollers 58. In operation, the ring 46 tends to be turned by its frictional contact with the rotor shaft 32 and is not a tight fit on the rotor 18.

Should the housing rotate at a speed greater than that of the shaft 32, this tends to rotate the rollers 58 in a clockwise direction in Figure 2, so that the rollers 58 are carried to the concavities 56 of the wings 50, at which locations the recesses 51 are greater in depth than the diameters of the rollers so that the wedging of the rollers, described above, is eliminated, and the housing and shaft 16 are free to rotate independently of the shaft 32.

When the speed of the shaft 32 drops below that of the housing and the shaft 16, the cam surfaces 59 are unengaged with the rollers 58 and the shaft 32 is driven by the shaft 16.

It will be understood that although the rotor has been termed the drive member in the previous description, and the housing the driven member, this relationship could be reversed, without affecting the operation of the device in any way.

The clutch illustrated in Figures 1 to 3 engages and releases in one direction only.

In the modified form of the invention shown in Figures 4 to 6, the two-way clutch provides for driving and release in either of two directions, depending upon placement of its rollers. In this form of the invention, the housing 65 has an annulus 66 and an end plate 68 integral therewith, which is integral with an axial driven shaft 70 formed with an axial stub 72 projecting into the housing 65.

The opposite open end of the annulus 66 is provided with removable end plate 74 connected by screws 76 to the annulus 66. End plate 74 has an axial hollow cylindrical extension 78 terminating in a reduced axial hollow extension 80 in which is disposed a bushing 82.

Drive shaft 84 extends through the bushing 82, and is integral within the housing 65 with a hollow cylindrical larger diameter boss 85 which has an open end receiving the stub 72 of the drive shaft 70. The boss 85 is on the adjacent end of a rotor 87, the boss 85 being journaled in the reduced hollow boss 88 on the adjacent end of a roller retaining ring 86. The retaining ring 86 includes an end wall 89 on the boss 87 and a peripheral wall 90 on the end wall 87. The outer side of the peripheral wall 90 bears against the inner side 91 of the annulus 66 and is provided with roller slots 92 uniformly spaced about the circumference of the wall 90. The rollers 94 engage in the slots 92 in the same manner as in the first described form of the invention.

The rotor 87 has an axial bore 98 provided with a lever 100 into which the stub 72 extends.

As illustrated in Figure 4, the rotor 89 has radially, outwardly extending wings 102, which, instead of being comma-shaped, as in Figures 1 to 3, are hour-glass shaped, and have concavities 104, 106 n their opposite ends, each merging into a cam surface 107, 109, respectively.

Adjacent wings 102 define recesses 108 therebetween and the two oppositely and outwardly inclined cam surfaces 107, 109 which form the bottom of each recess, and each recess 108 embraces two roller slots 92 and a single roller 94. When the clutch is operated in one direction the rollers 94 are engaged with wing concavities 106, as shown in Figure 4. When the clutch is rotated in the opposite direction, the rollers 94 engaged with the concavities 106 are removed therefrom and wedged between the cam surfaces 107 and the inner side of the peripheral wall 90 of the retaining ring. To reverse the action of the clutch the rollers 94 can be removed from the ends of the recesses 108 adjacent the concavities 106 and replaced in the ends of the recesses adjacent to the concavities 104.

In Figure 7 is shown an embodiment of the invention in which the drive is transmitted not from one shaft, such as shaft 32 to another shaft, such as the shaft 16, but instead to a wheel 109 which may be rotated for any purpose desired, as for example, to provide a drive pulley. The wheel 109 is bolted to a flange 110 formed upon a housing 112, the housing being analogous to the housings of the above described forms of the invention and being formed with a stepped axial extension 114. The drive shaft 32 extends into the housing, and is equipped with a rotor in the same manner as shown in Figure 2, so as to drive the housing and hence the wheel 108.

In Figure 8, the drive shaft 32 extends into a housing 116 having a stepped extension 118. In this form of the invention, the housing 116 is integrally formed on its outer surface with a gear 120, and said gear 120, when driven in the manner previously described, responsive to rotation of the housing 116, may be in mesh with other gears, not shown, for providing a geared driving mechanism for any desired purpose.

Although three rollers are shown in each illustrated embodiment of the invention, there could be more than three, if desired.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative, it being considered that the invention comprehends any minor change in construction that may be permitted within the scope of the appended claim.

What is claimed is:

An over-running clutch comprising a housing including an annulus having opposite ends and an inner surface, a first end plate integral with one of the ends of said annulus, a second end plate secured to the other of the ends of said annulus, a driven shaft secured to said first end plate, a drive shaft having an end journaled axially through said second end plate, a rotor secured on the drive shaft, said rotor having a first end bearing against said first end plate and a second end in bearing engagement with said second end plate, a cup-shaped roller retainer ring having a peripheral wall and an end wall, said peripheral wall projecting toward said first end plate, said peripheral wall having an inner surface, said ring end wall being interposed between said second end plate and a portion of the rotor, means journalling said ring in said housing with the peripheral wall of the ring running against the inner surface of said annulus, said rotor being smaller in outside diameter than the inside diameter of said annulus and having said circumferentially spaced radial wings having radially outward ends running against said inner surface of the peripheral wall of the roller retainer ring, adjacent wings defining recesses in the rotor therebetween, said recesses having bottoms having portions inclined to define cam surfaces, an end of each wing having a concavity, said peripheral wall of the retainer ring having a free end and being formed with roller slots opening through said free end, and a roller in each recess having an outer side portion rotatably confined by and reachable through a related roller slot into engagement with the inner surface of said annulus and an inner side portion positioned within the related recess, the cam surfaces of the recesses being circumferentially spaced away from the concavities of the related wings, each of said recesses subtending two adjacent roller slots and each recess having a bottom having other cam surfaces angled oppositely to the first mentioned cam surfaces, the roller related to each recess being removable from one of the two roller slots subtended by the recesses and replaceable in the other roller slot.

References Cited in the file of this patent

UNITED STATES PATENTS

| 76,328 | Johnson et al. | Apr. 7, 1868 |
| 424,994 | McCune et al. | Apr. 8, 1890 |
| 1,465,486 | Sandiford | Aug. 21, 1923 |
| 2,049,880 | Winkler | Aug. 4, 1936 |
| 2,722,299 | Otis et al. | Nov. 1, 1955 |

FOREIGN PATENTS

| 342,176 | Great Britain | Jan. 29, 1931 |